US011856419B2

(12) United States Patent
Schwartz et al.

(10) Patent No.: US 11,856,419 B2
(45) Date of Patent: Dec. 26, 2023

(54) METHOD AND SYSTEM FOR COMMISSIONING ENVIRONMENTAL SENSORS

(71) Applicant: Xerox Corporation, Norwalk, CT (US)

(72) Inventors: David E. Schwartz, Concord, MA (US); Paloma J. Fautley, Concord, MA (US); Eric D. Cocker, Redwood City, CA (US); Warren Jackson, San Francisco, CA (US)

(73) Assignee: Xerox Corporation, Norwalk, CT (US)

( * ) Notice: Subject to any disclaimer, the term of this patent is extended or adjusted under 35 U.S.C. 154(b) by 125 days.

(21) Appl. No.: 17/404,159

(22) Filed: Aug. 17, 2021

(65) Prior Publication Data
US 2023/0053598 A1 Feb. 23, 2023

(51) Int. Cl.
*H04W 24/02* (2009.01)
*G06T 7/73* (2017.01)
(Continued)

(52) U.S. Cl.
CPC ........ *H04W 24/02* (2013.01); *G06K 7/10722* (2013.01); *G06K 7/1417* (2013.01); *G06T 7/74* (2017.01); *G06V 20/20* (2022.01); *G08B 21/182* (2013.01); *H04W 8/005* (2013.01); *H04W 84/18* (2013.01)

(58) Field of Classification Search
CPC ......... G08B 21/02; A41D 20/00; G01S 19/31; H04N 23/51; H04R 1/028; H04R 1/08
See application file for complete search history.

(56) References Cited

U.S. PATENT DOCUMENTS 5,165,064 A    11/1992   Mattaboni
5,535,331 A    7/1996   Swoboda et al.
(Continued)

FOREIGN PATENT DOCUMENTS

CN   106687773    *   8/2015   ............ G01D 21/00
CN   207662867    *   11/2017
(Continued)

OTHER PUBLICATIONS

Bhadauria, D. et al., "Robotic Data Mules for Collecting Data over Sparse Sensor Fields", Journal of Field Robotics (2011) 28(3):388-404.
(Continued)

*Primary Examiner* — Hongmin Fan
(74) *Attorney, Agent, or Firm* — Fox Rothschild LLP

(57) ABSTRACT

Methods and systems to commission building environmental sensors are disclosed. The system include a device that will move about the environment of a building (inside and/or outside) and detect building environmental sensor devices that are installed in the environment. For each of the sensor devices, in response to detecting the sensor device, the system will retrieve an identifier for the sensor device, and it will determine whether the sensor device is registered with a control system. If the sensor device is registered with the control system, the system will not automatically implement a commissioning process with the sensor device. If the sensor device is not registered with the control system, the system will automatically implement the commissioning process with the sensor device.

46 Claims, 4 Drawing Sheets

(51) Int. Cl.

| | | |
|---|---|---|
| *G06V 20/20* | (2022.01) | |
| *G06K 7/10* | (2006.01) | |
| *G06K 7/14* | (2006.01) | |
| *G08B 21/18* | (2006.01) | |
| *H04W 8/00* | (2009.01) | |
| *H04W 84/18* | (2009.01) | |

(56) References Cited

U.S. PATENT DOCUMENTS

| | | | |
|---|---|---|---|
| 9,069,357 | B2 | 6/2015 | Hsu et al. |
| 9,144,360 | B2 | 9/2015 | Ozick et al. |
| 9,568,519 | B2 | 2/2017 | Hwang et al. |
| 9,800,431 | B2 | 10/2017 | Vollmer et al. |
| 9,881,342 | B2 | 1/2018 | Helitzer et al. |
| 9,974,612 | B2 | 5/2018 | Pinter et al. |
| 10,042,341 | B1 | 8/2018 | Jacob |
| 10,250,955 | B2 | 4/2019 | Schwartz et al. |
| 10,281,166 | B1 * | 5/2019 | Hutz .............. H04L 12/2825 |
| 10,343,283 | B2 | 7/2019 | Pinter et al. |
| 10,380,863 | B2 | 8/2019 | Wedig et al. |
| 10,399,223 | B2 | 9/2019 | Wang et al. |
| 10,405,070 | B2 * | 9/2019 | Schwarzkopf .......... H04Q 9/00 |
| 10,518,414 | B1 | 12/2019 | Cui et al. |
| 10,562,184 | B2 | 2/2020 | Yamamoto et al. |
| 10,598,493 | B2 | 3/2020 | Zhu |
| 11,163,319 | B2 | 11/2021 | Tuukkanen et al. |
| 2004/0193957 | A1 | 9/2004 | Swoboda et al. |
| 2004/0250150 | A1 | 12/2004 | Swoboda et al. |
| 2005/0057370 | A1 | 3/2005 | Warrior et al. |
| 2012/0143516 | A1 | 6/2012 | Mezic |
| 2012/0247203 | A1 | 10/2012 | Zhang et al. |
| 2012/0305661 | A1 | 12/2012 | Malchiondo et al. |
| 2013/0109406 | A1 | 5/2013 | Meador et al. |
| 2015/0229488 | A1 | 8/2015 | Averitt |
| 2015/0351084 | A1 | 12/2015 | Werb |
| 2017/0270615 | A1 | 9/2017 | Fernandes et al. |
| 2018/0235060 | A1 | 8/2018 | Vendetti et al. |
| 2018/0293864 | A1 | 10/2018 | Wedig et al. |
| 2019/0368758 | A1 | 12/2019 | Aller et al. |
| 2020/0043329 | A1 | 2/2020 | O'Callaghan |
| 2020/0103529 | A1 | 4/2020 | Yeon et al. |
| 2020/0226426 | A1 | 7/2020 | Jarquin Arroyo et al. |
| 2020/0379947 | A1 | 12/2020 | Kagan et al. |
| 2021/0019484 | A1 | 1/2021 | Ladan et al. |
| 2021/0046650 | A1 * | 2/2021 | Deyle ................. G06Q 10/087 |
| 2021/0103260 | A1 | 4/2021 | Khurana et al. |
| 2022/0030402 | A1 | 1/2022 | Bartholic et al. |
| 2022/0154954 | A1 | 5/2022 | Sinur et al. |

FOREIGN PATENT DOCUMENTS

| | | | |
|---|---|---|---|
| EP | 2589943 | | 5/2013 |
| EP | 3456157 | | 3/2019 |
| JP | 2017182333 | * | 3/2016 |
| WO | 2016154306 | | 9/2016 |

OTHER PUBLICATIONS

Jin, M. et al., "Automated Mobile Sensing: Towards High-Granularity Agile Indoor Environmental Quality Monitoring", Building and Environment 127 (2018) 268-276.

Lamarca, A. et al., "Making Sensor Networks Practical with Robots", In: Mattern F., Naghshineh M. (eds) Pervasive Computing. Pervasive 2002. Lecture Notes in Computer Science, vol. 2414. Springer, Berlin, Heidelberg.

Mantha, B.R.K et al., "Robotic Data Collection and Simulation for Evaluation of Building Retrofit", Automation in Construction 92 (2018) 88-102.

Nguyen, C. et al., "Wireless Sensor Nodes for Environmental Monitoring in Internet of Things", IEEE (2015).

Nguyen, M. et al., "Collaborative and Compressed Mobile Sensing for Data Collection in Distrubuted Robotic Networks", DOI 10.1109/TCNS.2017.2754364, IEEE (2017).

Di Francesco et al., "Data Collection in Wireless Sensor Networks with Mobile Elements: A Survey," 2011, ACM Transaction on Sensor Networks vol. 8, No. 1, Article 7, 31 pages (2011).

Chakrabarti et al., "Using Predictable Observer Mobility for Power Efficient Design of Sensor Networks," Springer-Verlag Berlin Heidelberg, pp. 129-145 (2003).

* cited by examiner

METHOD AND SYSTEM FOR COMMISSIONING ENVIRONMENTAL SENSORS

BACKGROUND

Most modern buildings have multiple environmental sensors positioned in various locations. Sensors such as thermostats and other temperature sensors, light sensors, and motion detectors may be used to measure one or more variables about the building's status and use those measurements to control the building's heating, ventilation and air conditioning (HVAC) system, lighting systems, and other systems. In addition, security sensors such as door and window opening sensors, cameras, sound recorders and motion detectors can be used to determine whether a building's security has been breached.

When new sensors are installed in a building, and periodically at other times such as during maintenance or upgrade events, many sensors must be commissioned before they can provide effective operation. Commissioning a sensor involves processes such registering a sensor's identifier and location with a central system, applying parameters of operation to the sensor (such as set points and/or conditions upon which the sensor will trigger a signal), calibrating the sensor to ensure that it takes appropriate measurements, testing the sensor, and/or taking other actions.

The process of commissioning sensors and related components or systems is often expensive, and it can be unreliable. For example, when a sensor fails, or when a sensor's commissioning process is not properly completed, there is no easy way to identify that sensor's operation may be compromised. This can limit the number and types of devices that can be installed in many scenarios. For example, most buildings have only one temperature sensor per room, and many use a single temperature sensor to monitor multiple rooms. Many building HVAC systems could be operated more intelligently and efficiently if more comprehensive monitoring data were available. In addition, a large cost in operating building HVAC systems is that of determining the relation between the sensors, the comfort of the building occupants, and the effect of actuators on the sensors. This usually requires a period of system identification in which the various actuators are adjusted over a wide range to see the response of the building and the sensors to the actuators. This procedure can be disruptive to the ongoing occupant activity. Methods that can minimized this disruption are desired.

This document describes methods and systems that are directed to addressing the technical problems described above and/or other issues.

SUMMARY

In various embodiments, a system that includes an autonomous or otherwise portable electronic device is programmed to commission building environmental sensors. The portable device will move about the environment of a building (inside and/or outside) and detect building environmental sensor devices that are installed in the environment. For each of the sensor devices, in response to detecting the sensor device, the system will retrieve an identifier for the sensor device, and it will determine whether the sensor device is registered with a control system. If the sensor device is registered with the control system, the system will not automatically implement a commissioning process with the sensor device (i.e., not without determining whether one or more conditions are satisfied, as described below). If the sensor device is not registered with the control system, the system will automatically implement the commissioning process with the sensor device.

To implement the commissioning process the system may perform one or more of the following for each sensor: (a) send a location of the sensor device and the identifier to the control system; (b) transfer, to the sensor device, a token that the sensor device can use to communicate with the control system via the wireless network; or (c) transfer one or more or configuration parameters to the sensor device. In addition or alternatively, in the commissioning process the system may determine whether the sensor device requires calibration by using an environmental sensor of the electronic device to detect a first value of an environmental parameter, querying the sensor device for a second value of the environmental parameter as detected by a component of sensing device, and comparing the first value and the second value to determine whether the values match (in which the term "match" does not necessarily mean an exact match but which instead may include a tolerance level or threshold discrepancy); if the values do not match, the system may determine that the sensing device requires calibration.

If the system includes a camera, then to detect the building environmental sensor devices the system may analyze images captured by the camera to recognize codes that correspond to sensors in the images. Suitable codes include, for example, two-dimensional bar codes, three-dimensional bar codes, or alphanumeric codes. In addition or alternatively, the system may use an object classifier to analyze images captured by the camera to identify an object that is a sensor in the images.

Optionally, to determine the location of the sensor device, the system may perform one or more of the following: (a) receive images from a camera of the system, process the images to recognize a known landmark in the images, access a map of the environment, and determine the location to correspond to a place of the known landmark in the map; (b) receive images from the camera, output the images on a display of the portable electronic device or of a remote control system, and receive the location via a user interface of the portable electronic device or of the remote control system; (c) receive signals from beacons in the environment in which the system is moving, and using a triangulation process to process the signals and yield the location; or (d) implement a simultaneous localization and mapping algorithm in an autonomous mobile robotic device that caries the camera as the autonomous mobile robotic device moves about the environment.

Optionally, the portable electronic device may query the sensor device for a battery level report and analyze a signal received from the sensor device in response to the query. When the signal indicates that a battery level of the sensor device is below a threshold, the system will generate a low battery alert.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and such use is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

Figure 1:
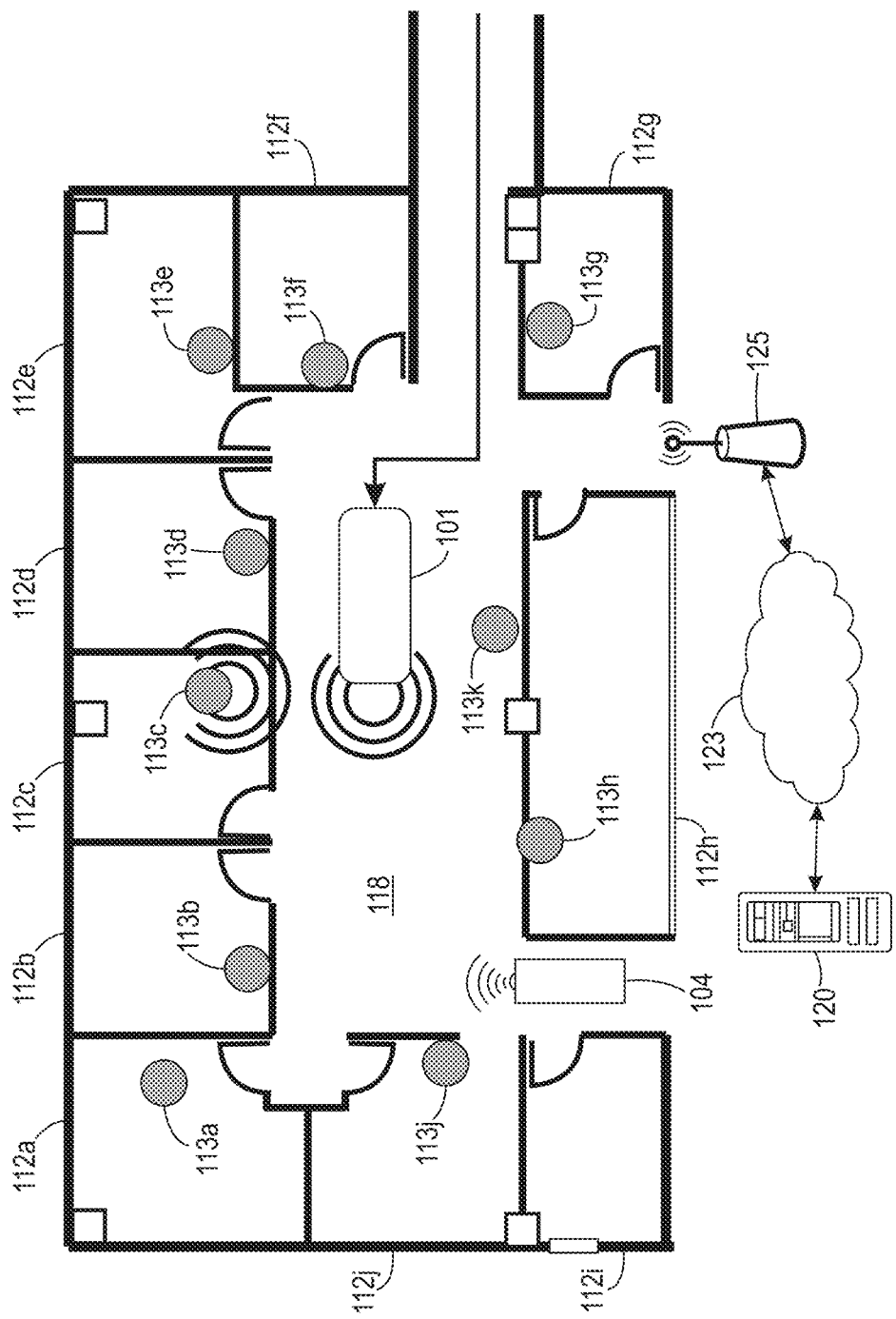
FIG. 1 illustrates an example environment in which building environmental sensors are installed.

FIG. 1 illustrates an example environment that is a building layout with multiple rooms 112a . . . 112j and a corridor 118 that leads to the entrances of each room. Any number of building environmental sensors 113a . . . 113k that are installed in rooms, the corridors or other building areas. The sensors may be attached to or integral with: (i) a wall, ceiling, floor of the room or corridor; or (ii) furniture or other items within the room or corridor. Alternatively, some of the sensors may be freestanding sensors that are not attached to any particular element of the room or corridor. The sensors may be temperature sensing devices, light sensors, humidity sensors, gas detection sensors, sound pressure or other audio sensors, motion sensors and/or other sensors.

A portable electronic device that provides the function of a commissioning device 101 moves through the environment and detects the various sensors 113a . . . 113k. The commissioning device 101 may be a portable computing device such as a smartphone, tablet computer, or a dedicated data collection unit. The device may be carried by a person, or it may be integral with a wearable electronic device such as an augmented reality (AR) headset, AR eye glasses or other wearable AR device that includes a see-through display which allows the device to generate and display images for the viewer to see superimposed on the real-world environment. Alternatively, the commissioning device 101 may be carried by or integral with a robotic vehicle that automatically (or with human guidance) navigates the facility using a stored map and one or more positional sensors such as one or more cameras, and radar, sonar or LiDAR sensors.

The commissioning device 101 may, in some embodiments, include a first transceiver that is configured to communicate with the building sensors using near-field communication (NFC) or a short-range communication protocol when the device and the sensors are within communication range of each other. For example, in FIG. 1, commissioning device 101 is proximate and in the communication range of sensor 113c. The commissioning device 101 also may include a second transceiver that is configured to communicate with an external service such as server 120 via a wireless communication network 123. The wireless communication network 123 may be a cellular network in which the commissioning device 101 communicates with a receiver that is outside of the building, and/or or a local area network via which the commissioning device 101 communicates via one or more wireless access points 125 located at various locations throughout the building.

Figure 2:
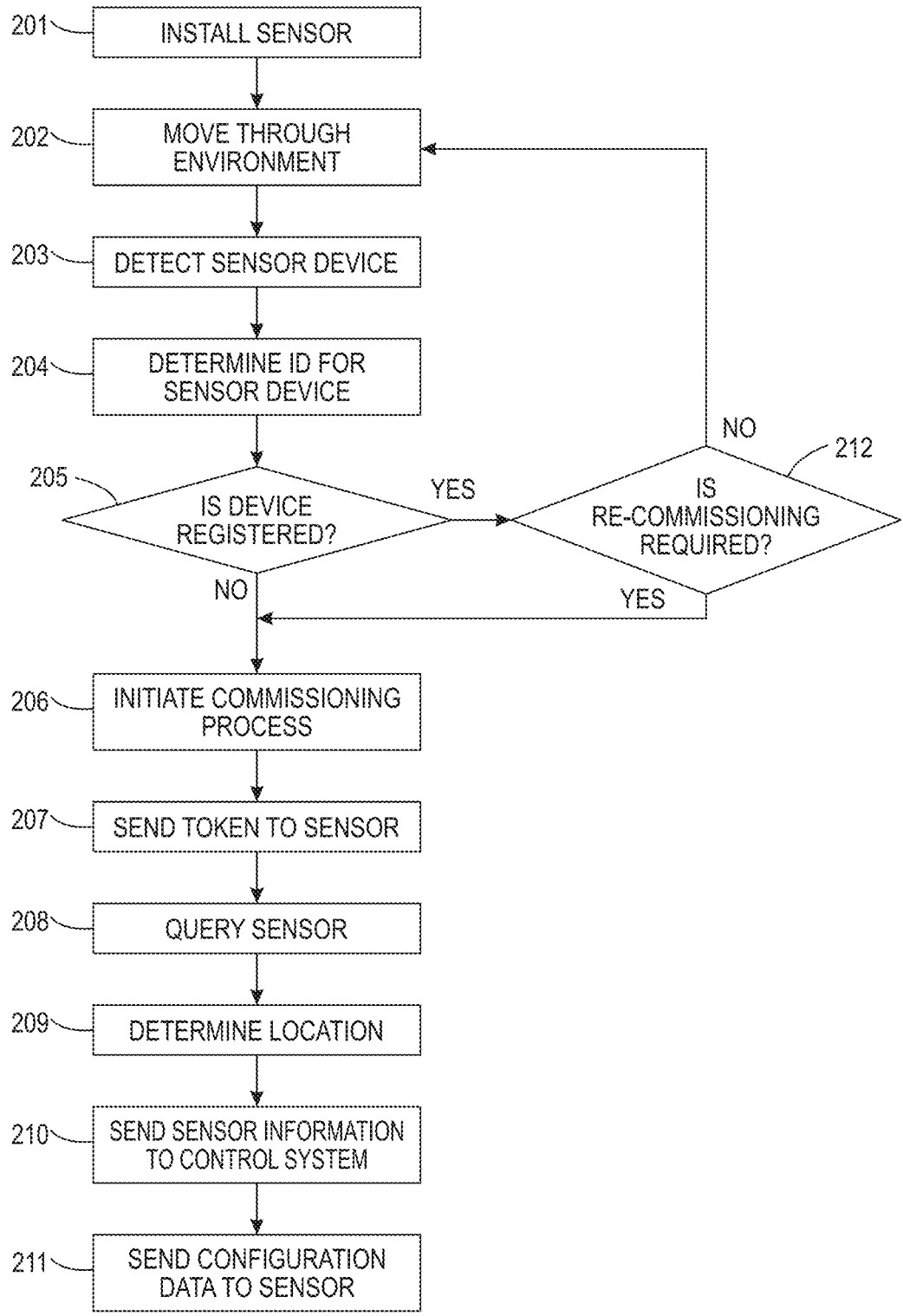
FIG. 2 illustrates a process by which a system may commission a set of building environmental sensors.

FIG. 2 illustrates a process by which a commissioning device may commission building environmental sensors as the device moves about the building's environment. The sensors may be in place in the environment, and/or the process may include installing one or more new sensors at step 201. Installation may include adding a label or tag to an existing or new sensor, in which the label or tag includes a code that identifies the sensor, as will be described below. As the device moves through the environment (at 202), it will detect environmental sensors that are installed in the environment at 203. The device may detect sensors in any number of ways. For example, the device may have an information receiving system that includes a camera, and if so it may process images received by the camera to detect sensors that are in the camera's field of view. The system may do this in any suitable way, such as by known image recognition processes such as those that use convolutional neural networks to classify images, processes that use principal component analysis or linear discriminant analysis, or other features. The sensor also may exhibit a visible code on its display or on a label or tag that is attached to the sensor. If the code contains letters or numerals, the system may recognize those characters using any suitable optical character recognition (OCR) process. In addition or alternatively, the sensors may include one or more recognizable codes imprinted on their housing, and the system may detect and parse the code to determine that the device is a sensor. Codes may be matrix codes, QR codes and other two-dimensional barcodes, three-dimensional barcodes, or alphanumeric symbols (i.e., letters and numbers), or other codes.

Alternatively, the sensor may have a transmitter that emits an identifying signal, using a protocol such as radio frequency identification (RFID) transmission, Bluetooth, Bluetooth Low Energy, or other near-field or short-range communication protocols. The sensing device may include a receiver with an antenna and other components that are configured to detect the signal according to any of various communication protocols, and it may parse the signal when received to extract the device's identifier from the signal.

The sensing device's code or signal may include a unique identifier for the sensor device, such as a serial number. The commissioning device may detect the unique identifier (204) in the code, and it may use the identifier to determine whether the sensor device is registered with a control system (at 205). To do this, the sensor may access a locally stored database of registered devices and determine whether the ID corresponds to an ID that is in the database. Alternatively, the system may transmit the ID to a remote server that contains a database of registered devices, and it may query the remote server to return an indication of whether the ID corresponds to an ID that in the database. If the system determines that the ID does not correspond to an ID in the database at 205, it will initiate a commissioning process for the sensor at 206. Otherwise, the system may not automatically initiate a commissioning process; instead, may either continue moving and seeking other sensor devices or determine whether other conditions merit re-commissioning the sensor device at 212, examples of which will be discussed in more detail below.

If the system cannot detect a unique identifier for the sensor device, or if the device's unique identifier is not recognized, then when determining the ID for the device at 204 the commissioning device optionally may assign a new ID to the sensor. In applications in which the device electronically communicates with the sensor, the device it may transmit the new ID to the sensor. The sensor may then store the ID in its memory or firmware. In applications in which the device does not communicate with the sensor by sending signals to the sensor, the device may output a prompt or transmit a communication to an external computing device, with a message indicating that a label or tag with the ID should be installed on the sensor.

The commissioning process may include any of various steps. For example, if the sensor is not already registered with the control system, then at 207 the commissioning device may retrieve, generate, or otherwise access a unique access token that the sensor can use to communicate with the control system, and the commissioning device may pass the token to the sensor by transmitting the token to the sensor. The token may be, for example, one that the commissioning device retrieves from the control system, or one that the commission device generates according to a token-based authentication protocol that the control system uses.

As part of the commissioning process, the system may register the sensor device with the control system by sending sensor information to the control system at 210. The sensor information may include, at a minimum, the sensor's ID. In addition, the commissioning device may determine a location of the sensor at 209 and it may include the location data in the sensor information that it sends at 210. The commissioning device may receive the location data in one or more of the signals that the sensor emits, or as part of the code that the commissioning device's camera detects. Alternatively, the commissioning device may determine the sensor's location at 208 using any suitable location determination process, such as:
- by receiving images from a camera, processing the images to recognize a known landmark in the images, accessing a map of the environment, and determining the location to correspond to a place of the known landmark in the map;
- by receiving images from a camera, outputting the images on a display of the commissioning device or on a remote control system, and receiving, via a user interface of the commissioning device or the remote control system, the location;
- by receiving signals from beacons in the environment in which the commissioning device is moving, and using a triangulation process to process the signals and yield the location;
- by receiving location data in signals via a global positioning system sensor of the commissioning device; or
- implementing a simultaneous localization and mapping algorithm (SLAM) as the device moves about the environment.

The commissioning process also may include querying the sensor at 207 for one or more parameters such as battery level, operating time, sensed data over a period of time, or other information. The system may include some of this data in the information that it sends to the control system at 210. Optionally, the commissioning device and/or the control system may analyze some of the information to determine whether the sensor requires maintenance. For example, the system may query the sensor for a battery level report, and it may analyze the response to determine whether the sensor's battery level is below a threshold. If the battery level is below a threshold, or if other returned data indicates that the sensor requires maintenance, the system may generate and include an alert in the information that it sends to the control system, and/or it may output the alert on a local user interface of the commissioning device.

As another example, the commissioning process may include calibration of the sensor. For example, if the commissioning device includes an environmental sensor such as a temperature, humidity or light sensing device, then when querying the sensor at 207 the commissioning system may request the current values of any or all of the environmental conditions that both the sensor and the commissioning device are currently sensing. If the values detected by the sensor and the commissioning device do not match each other, then the commissioning device may transmit a message to the sensor that causes the sensor to initiate a calibration process, a message to the control system indicating that calibration is required, or both, (In this context, "match" may not require a precise match; values may be considered to match if they are no more than a specified threshold margin of error from each other.)

The commissioning process also may include transmitting configuration data to the sensor at 211. As noted above, the configuration data may include a unique ID that the control system will use to recognize the sensor. The configuration data also may include configuration parameters for operation of the device such as one or more set points such as temperature settings, on/off times, or other settings or operating parameters. The commissioning device may retrieve the configuration data from local memory, or from the control system via a communication link.

As noted above, when a sensor device is not registered with the system the commissioning device will automatically initiate a commissioning process at 206. It should be noted that in this situation "automatically" could mean without user input; or it could also include outputting a prompt or sending a query to a remote server indicating that commissioning is required; actual commissioning may begin upon receipt of a response to the prompt or query which indicates that commissioning should proceed. In addition, if the sensor device is registered with the control system at 205, then at 212 the system may determine whether the sensor device requires re-commissioning. The system may use any suitable rule set to determine this, such as by determining that recommissioning is required if: (a) the sensor device was last commissioned more than a threshold period of time ago; (b) the sensor device received a software or firmware update since it was last commissioned; (c) the sensor device received maintenance since it was last commissioned; (d) the sensor has been moved to a different location; or (e) other criteria are satisfied.

Figure 3:
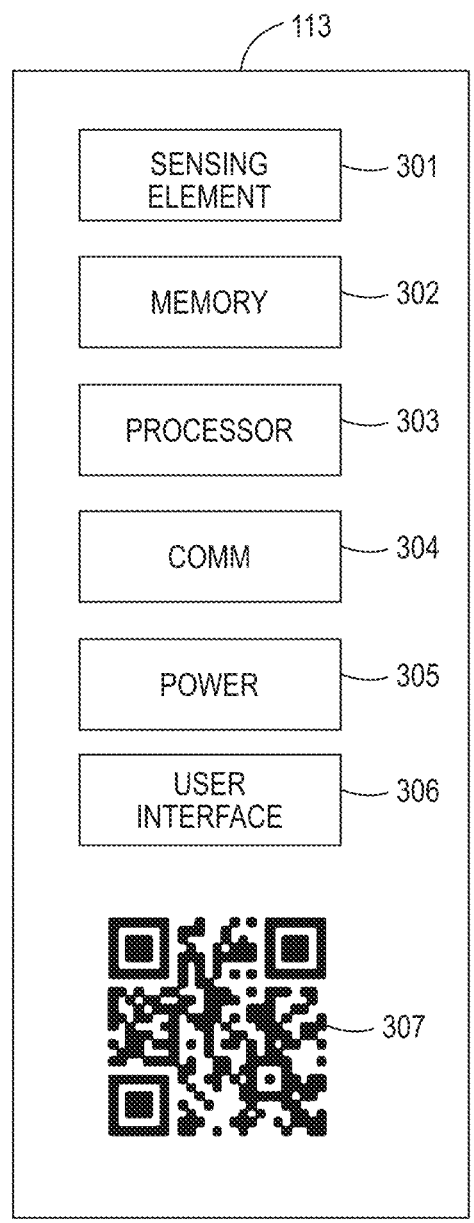
FIG. 3 illustrates example components that a building environmental sensor may include.

FIG. 3 illustrates example components that an environmental sensor 113 may include. The components include a sensing element 301, memory 302, a processor 303, a communication system 304, and a power source 305. Optionally, the sensor also may include a user interface 306 such as a display, an audio speaker and/or one or more indicator lights for displaying measured parameters, status messages (such as messages indicating that maintenance is required), or other messages.

If sensor 113 is a temperature sensor, the sensing element 301 may include, for example, a thermocouple, bi-metallic thermostat, thermistor or resistive temperature detector (RTD). If sensor 113 is a light sensor, the sensing element 301 may include, for example, a photo-emissive or photo-conductive cell, a light dependent resistor, a photo-voltaic cell, a photojunction device such as a photodiode or phototransistor, or other device. Other types of sensors are possible. If sensor 113 is a humidity sensor, the sensing element 301 may include, for example, a capacitive sensor that includes a thin strip of metal oxide between two electrodes. If sensor 113 is a gas detection sensor, the sensing element 301 may include, for example, an electrochemical sensor with sensing electrodes that are capable of measuring carbon monoxide or other gases, an infrared transmitter and receiver that compares transmitted light to reflected and received light to determine whether differences between the two light streams indicate that a hydrocarbon gas may be present, or a catalytic sensor with a coil that oxidizes when it comes in contact with a combustible gas. If sensor 113 is a motion sensor, the sensing element 301 may include, for example, a passive infrared sensor transmitter and receiver that compares transmitted light to reflected and received light to determine whether a moving object is interfering with the light paths. Other types of sensors may be used.

The power source 305 of the sensor 113 may include, for example, a battery, a solar panel, or a wire or other conductor that leads to an external power supply.

When a sensor includes a memory 302, the sensor may include a device or segment (such as a memory sector) that stores data captured by the sensing element, along a device or sector that stores programming instructions that the sensor's processor 303 will use to manage the data stored in the memory. The communication system 304 of the sensor may include a transmitter and/or receiver for wireless communication, a communication port configured to receive a USB, HDMI, or any other type of wired communication link, or a combination of any of these designed to send to and/or receive data from other devices. When a wireless communication system is available, the other devices may be arranged in an Internet-of-Things (IOT)-type arrangement using a relatively low-power, short-range data transmission protocol such Bluetooth, Bluetooth low energy (BLE), Zigbee or Z-wave; an NFC protocol such as one that employs RFID tags; or another open or proprietary transmission protocol. In some embodiments, the system also may include a transceiver that is configured to communicate with a central or remotely controlled system via a local Wi-Fi network. Regardless of the protocol used, the sensor's programming instructions may direct the processor to arrange the data to be transmitted or otherwise transferred according to the protocol.

As noted above, some sensor devices may include a housing on which a code 307 such as a two-dimensional barcode, a matrix barcode (as shown), a three-dimensional barcode, or another code may be imprinted, whether directly on the housing or on a label or tag that is affixed to the housing.

While this document focuses on applications for commissioning an environmental sensor 113, the methods and systems can also apply to other items of equipment that include some or all of the features shown in FIG. 3. For example, instead of an environmental sensor, the methods and systems can be used to commission HVAC equipment such as heaters or air conditioners, production sensors or manufacturing equipment in manufacturing facilities, print devices in a print shop or office environment, and/or other devices. The equipment could also include one or more networked personal comfort devices such as personal fans, or small individual or heating units. The equipment could also include other devices such as remotely controlled window coverings such as shades or blinds. When the occupant adjusts these devices, the operational setpoint to achieve personal comfort can serve as a personalized measure of building comfort. For such applications, the name of the appropriate device would be substituted for the word "sensor" or "environmental sensor" in the relevant parts of this description.

Figure 4:
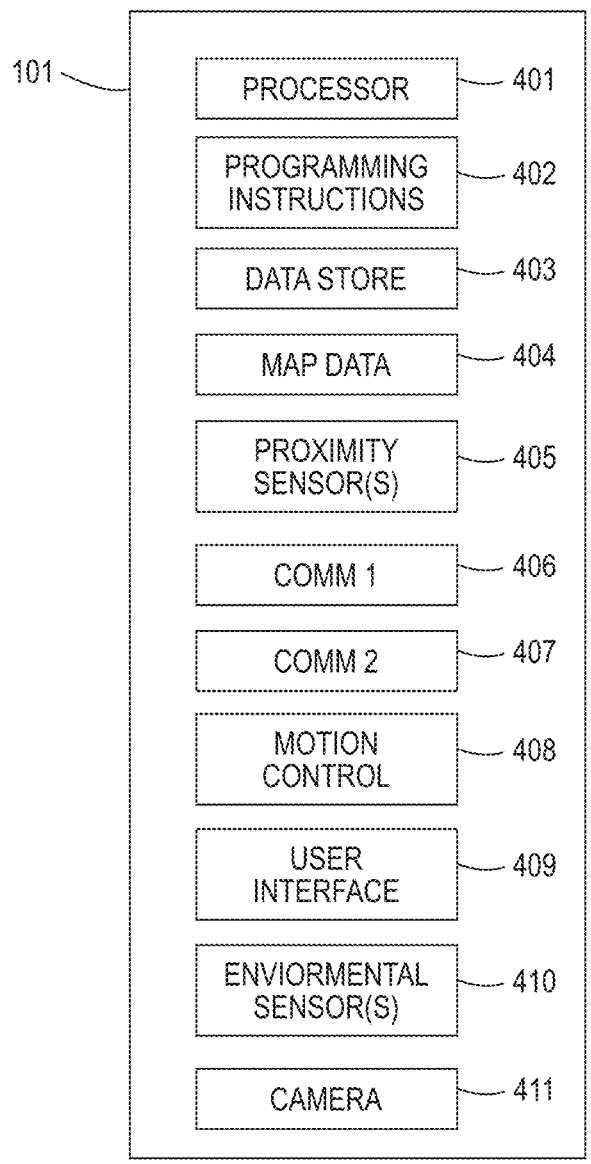
FIG. 4 illustrates example components of a commissioning device.

FIG. 4 illustrates example components of a commissioning device 101. The commissioning device will include a processor 401 and a memory with programming instructions 402 for instructing the processor to perform the methods described in this document. The commissioning device 101 also may include a data store 403 for storing set points and/or other data that the device will transfer to proximate building environmental sensors. A first communication system 406 may include an antenna or other transceiver, a communication port, or both and be configured to receive the data by communicating with the proximate sensors via NFC or a short-range communication protocol as described above. A second communication system 407 may include a transceiver that is configured to transfer data to an external service, such as via a Wi-Fi or cellular network. Additional communication devices may be included, each of which is configured to receive data transmitted via a transmission protocol that is different than those provided by the first and second communication systems. The data collection device also may include a user interface 409 for outputting information to the device's user and/or receiving information from the user. By way of example, the user interface 409 may include a display device on which the system may output a map, navigation instructions or other information. If the commissioning device is a wearable AR device, the user interface 409 may be a see-through display device. In such a situation, the system may use a camera 411 of the commissioning device to capture images that correspond to the AR device's field of view as the wearable AR device is moved through the environment, and it may identify and recognize sensors in the field of view in real-time as the AR device moves, using recognition processes such as those described above in the discussion of FIG. 2.

The user interface 409 also may include a speaker via which the system may audibly output navigation instructions or other information. In some embodiments, the data collection device also may include one or more environmental sensors 410 such as a temperature sensor, light sensor, humidity sensor, or gas detection sensor. As noted above, the commissioning device also may include one or more cameras 411 for capturing images of the environment as the device moves through the environment.

In some embodiments, the data collection device may be a component of, or carried by, a mobile robotic device. A mobile robotic device will include motion control hardware components 408 such as wheels and a motor that, in response to commands from the processor, can cause the device to move through the building. The robotic device may include an autonomous motion control system that generates and implements a trajectory for the robotic device with minimal or no human intervention. Alternatively, the robotic device may receive navigation commands from a human operator via a local or remote user interface. A robotic device will store map data 404 in a memory or receive map data from an external service, and it will have one or more onboard proximity sensors 405 that are configured to detect features that are near the robotic device and within the environment in which the robotic device is traveling. Example proximity sensors 405 include a global positioning system (GPS) receiver, a camera, and/or radar, sonar or LiDAR sensors. The robotic device's processor 401 will process the map data 404 and the data received from onboard sensors to determine the robotic device's location within a facility and cause the robotic device to move throughout the facility. Any robotic devices and navigation processes that are now known or developed in the future may be used, such as those described in U.S. Pat. No. 10,562,184, the disclosure of which is fully incorporated into this document by reference.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices that are data collection devices are discussed above in the context of FIG. 4.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A memory may contain programming instructions that are configured to cause a processor to execute any of the actions described above in this document. A computer program product is a memory device with programming instructions stored on it.

In this document, the terms "robotic device" and "robotic system" refer to an electronic device or system that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. As noted above, a robotic device may include an autonomous motion control system that generates and implements a trajectory for the robotic device with minimal or no human intervention. Alternatively, a robotic device may receive navigation commands from a human operator via a local or remote user interface. Example robotic devices may include, without limitation, delivery robots, autonomous vehicles, drones and other autonomous robotic devices.

In this document, the term "transceiver" refers to a device that includes an antenna and other components that can transmit data to and/or receive data from one or more other devices via a wireless communication path.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for commissioning building environmental sensors, the system comprising:
   a portable electronic device comprising a processor, a receiver, and a non-transitory computer-readable medium containing programming instructions that are configured to cause the processor to, as the portable electronic device moves about an environment:
   detect, via the receiver, each of a plurality of building environmental sensor devices that are installed in the environment;
   for each of the sensor devices, in response to detecting the sensor device:
      determine an identifier for the sensor device,
      determine whether the sensor device is registered with a control system,
      if the sensor device is registered with the control system, determine whether the sensor device requires re-commissioning,
      in response to determining that the sensor device requires recommissioning, implement a commissioning process with the sensor device, and
      if the sensor device is not registered with the control system, automatically implement the commissioning process with the sensor device.

2. The system of claim 1, wherein the instructions to automatically implement the commissioning process comprise instructions to:
  determine a location of the sensor device; and
  send the location and the identifier to the control system.

3. The system of claim 1, wherein the instructions to implement the commissioning process further comprise instructions to:
  identify a token from the control system that the sensor device can use to communicate with the control system via a wireless network; and
  transfer the token to the sensor device.

4. The system of claim 1, wherein:
  the receiver comprises a camera; and
  the instructions to detect each of the building environmental sensor devices comprise instructions to:
    analyze images captured by the camera to recognize codes in the images, wherein the codes comprise one or more of the following: two-dimensional bar codes, three-dimensional bar codes, or alphanumeric codes, and
    upon detection of one of the codes, parse the detected code to extract the identifier for the sensor device from the detected code.

5. The system of claim 1, wherein:
  the receiver comprises a camera; and
  the instructions to detect each of the building environmental sensor devices comprise instructions to analyze images captured by the camera to identify an object that is a sensor device in the images.

6. The system of claim 1, wherein:
  the receiver comprises a camera;
  the system comprises a wearable augmented reality device comprising a see-through display; and
  the instructions to detect the building environmental sensor devices comprise instructions to:
    cause the camera to capture the images to correspond to a field of view of the see-through display in real time as the wearable augmented reality device is moved through the environment, and
    determine whether any of the sensor devices appear in the field of view of the see-through display in real time.

7. The system of claim 1, wherein:
  the instructions to detect each of the building environmental sensor devices comprise instructions to:
    analyze signals received via the receiver, wherein the signals comprise one or more of the following: radio frequency signals, near-field communication signals, or optical signals; and
    upon detection of one of the signals, parse the detected signal to extract the identifier for the device from the detected signal.

8. The system of claim 2, wherein the instructions to determine the location of the sensor device comprise instructions to perform one or more of the following:
  receive images from a camera of the system, process the images to recognize a known landmark in the images, access a map of the environment, and determine the location to correspond to a place of the known landmark in the map;
  receive images from the camera, output the images on a display of the portable electronic device or of a remote control system, and receive the location via a user interface of the portable electronic device or of the remote control system; or
  receive signals from a plurality of beacons in the environment in which the system is moving, and use a triangulation process to process the signals and yield the location.

9. The system of claim 1, wherein the instructions to implement the commissioning process further comprise instructions to:
  detect, via an environmental sensor of the portable electronic device, a first value of an environmental parameter;
  query the sensor device for a second value of the environmental parameter as detected by a component of sensing device;
  compare the first value and the second value to determine whether the first and second values match; and
  in response to determining that the first and second values do not match, determining that the sensor device requires calibration.

10. The system of claim 1, wherein the system comprises a mobile robotic device.

11. The system of claim 2, wherein the instructions to determine the location comprise instructions to implement a simultaneous localization and mapping algorithm as the portable electronic device moves about the environment.

12. The system of claim 1, wherein the instructions to automatically implement the commissioning process with the sensor device further comprise instructions to:
  determine one or more configuration parameters for the sensor device; and
  transmit the one or more configuration parameters to the sensor device.

13. The system of claim 1, further comprising instructions to, for each of the sensor devices, in response to detecting the sensor device:
  query the sensor device for a battery level report;
  analyze a signal received from the sensor device in response to the query; and
  when the signal indicates that a battery level of the sensor device is below a threshold, generate an alert.

14. The system of claim 1, wherein the instructions to determine whether the sensor device requires re-commissioning comprises determining one or more of the following:
  determining whether the sensor device was last commissioned more than a threshold period of time ago;
  determining whether the sensor device received a software or firmware update since the sensor device was last commissioned;
  determining whether the sensor device received maintenance since the sensor device was last commissioned; or
  determining whether the sensor device has been moved to a new location.

15. A method of commissioning building environmental sensors, the method comprising:
  by an electronic device comprising a processor and a receiver, as the electronic device moves about an environment:
    detecting, via the receiver, each of a plurality of building environmental sensor devices that are installed in the environment;
    for each of the sensor devices, in response to detecting the sensor device:
      retrieve an identifier for the sensor device,
      determine whether the sensor device is registered with a control system, if the sensor device is registered with the control system, determine whether the sensor device requires re-commissioning, in response to the sensor device requiring recommissioning, implement a commissioning process with the sensor device, and if the sensor device is not registered with the control system, automatically implementing the commissioning process with the sensor device.

16. The method of claim 15, wherein automatically implementing the commissioning process comprises one or more of the following, for each sensor:
sending a location of the sensor device and the identifier to the control system;
transferring, to the sensor device, a token that the sensor device can use to communicate with the control system via a wireless network;
transferring one or more or configuration parameters to the sensor device;
determining whether the sensor device requires calibration by:
using an environmental sensor of the electronic device to detect a first value of an environmental parameter,
querying the sensor device for a second value of the environmental parameter as detected by a component of the sensor device,
comparing the first value and the second value to determine whether the first and second values match, and
when the first and second values do not match, determining that the sensor device requires calibration.

17. The method of claim 15, wherein:
the receiver comprises a camera; and
detecting each of the building environmental sensor devices comprises:
analyzing images captured by the camera to recognize codes that correspond to sensors in the images, wherein the codes comprise one or more of the following: two-dimensional bar codes, three-dimensional bar codes, or alphanumeric codes, or
analyzing images captured by the camera to identify an object that is a sensor in the images.

18. The method of claim 15, further comprising determining a location of the sensor device by performing one or more of the following:
receiving images from a camera of the electronic device, processing the images to recognize a known landmark in the images, accessing a map of the environment, and determining the location to correspond to a place of the known landmark in the map;
receiving images from the camera, outputting the images on a display of the electronic device or of a remote control system, and receiving the location via a user interface of the electronic device or of the remote control system;
receiving signals from a plurality of beacons in the environment in which the electronic device is moving, and using a triangulation process to process the signals and yield the location; or
implementing a simultaneous localization and mapping algorithm in an autonomous mobile robotic device that caries the camera as the autonomous mobile robotic device moves about the environment.

19. The method of claim 15 further comprising, by the electronic device:
querying the sensor device for a battery level report;
analyzing a signal received from the sensor device in response to the querying; and
when the signal indicates that a battery level of the sensor device is below a threshold, generating an alert.

20. The method of claim 15, wherein:
determining whether the sensor device requires re-commissioning comprises:
determining whether the sensor device was last commissioned more than a threshold period of time ago,
determining whether the sensor device received a software or firmware update since the sensor device was last commissioned,
determining whether the sensor device received maintenance since the sensor device was last commissioned, or
determining whether the sensor device has been moved to a new location.

21. A system for commissioning building environmental sensors, the system comprising:
a portable electronic device comprising a processor, a camera, a wearable augmented-reality device comprising a see-through display and a non-transitory computer-readable medium containing programming instructions that are configured to cause the processor to, as the portable electronic device moves about an environment:
cause the camera to capture images corresponding to a field of view of the see-through display in real time as the wearable augmented-reality device is moved through the environment;
detect each of a plurality of building environmental sensor devices that are installed in the environment by determining whether any of the sensor devices appear in the field of view of the see-through display in real time;
for each detected sensor device:
determine an identifier for the sensor device,
determine whether the sensor device is registered with a control system,
if the sensor device is registered with the control system, do not automatically implement a commissioning process with the sensor device, and
if the sensor device is not registered with the control system, automatically implement the commissioning process with the sensor device.

22. The system of claim 21, wherein the instructions to automatically implement the commissioning process comprise instructions to:
determine a location of the sensor device; and
send the location and the identifier to the control system.

23. The system of claim 21, wherein the instructions to implement the commissioning process further comprise instructions to:
identify a token from the control system that the sensor device can use to communicate with the control system via a wireless network; and
transfer the token to the sensor device.

24. The system of claim 21, wherein the instructions to determine the identifier for the sensor device comprise instructions to:
analyze images captured by the camera to recognize codes in the images, wherein the codes comprise one or more of the following: two-dimensional bar codes, three-dimensional bar codes, or alphanumeric codes, and
upon detection of one of the codes, parse the detected code to extract the identifier for the sensor device from the detected code.

25. The system of claim 22, wherein the instructions to determine the location of the sensor device comprise instructions to perform one or more of the following:
- process images from the camera to recognize a known landmark in the images, access a map of the environment, and determine the location to correspond to a place of the known landmark in the map;
- receive images from the camera, output the images on a display of the portable electronic device or of a remote control system, and receive the location via a user interface of the portable electronic device or of the remote control system; or
- receive signals from a plurality of beacons in the environment in which the system is moving, and use a triangulation process to process the signals and yield the location.

26. The system of claim 21, wherein the instructions to implement the commissioning process further comprise instructions to:
- detect, via an environmental sensor of the portable electronic device, a first value of an environmental parameter;
- query the sensor device for a second value of the environmental parameter as detected by a component of sensing device;
- compare the first value and the second value to determine whether the first and second values match; and
- in response to determining that the first and second values do not match, determining that the sensor device requires calibration.

27. The system of claim 22, wherein the instructions to determine the location comprise instructions to implement a simultaneous localization and mapping algorithm as the portable electronic device moves about the environment.

28. The system of claim 21, wherein the instructions to automatically implement the commissioning process with the sensor device further comprise instructions to:
- determine one or more configuration parameters for the sensor device; and
- transmit the one or more configuration parameters to the sensor device.

29. The system of claim 21, further comprising instructions to, for each of the sensor devices, in response to detecting the sensor device:
- query the sensor device for a battery level report;
- analyze a signal received from the sensor device in response to the query; and
- when the signal indicates that a battery level of the sensor device is below a threshold, generate an alert.

30. A system for commissioning building environmental sensors, the system comprising:
- a portable electronic device comprising a processor, a receiver, and a non-transitory computer-readable medium containing programming instructions that are configured to cause the processor to, as the portable electronic device moves about an environment:
  - detect, via the receiver, each of a plurality of building environmental sensor devices that are installed in the environment;
  - for each of the sensor devices, in response to detecting the sensor device:
    - determine an identifier for the sensor device,
    - determine whether the sensor device is registered with a control system,
    - if the sensor device is registered with the control system, do not automatically implement a commissioning process with the sensor device and
    - if the sensor device is not registered with the control system, automatically implement the commissioning process with the sensor device by:
      - determining a location of the sensor device by performing one or more of the following:
        - receiving images from a camera of the system, processing the images to recognize a known landmark in the images, accessing a map of the environment, and determining the location to correspond to a place of the known landmark in the map;
        - receiving images from the camera, outputting the images on a display of the portable electronic device or of a remote control system, and receiving the location via a user interface of the portable electronic device or of the remote control system; or
        - receiving signals from a plurality of beacons in the environment in which the system is moving, and use a triangulation process to process the signals and yield the location; and
      - send the location and the identifier to the control system.

31. The system of claim 30, wherein the instructions to implement the commissioning process further comprise instructions to:
- identify a token from the control system that the sensor device can use to communicate with the control system via a wireless network; and
- transfer the token to the sensor device.

32. The system of claim 30, wherein the instructions to detect each of the building environmental sensor devices comprise instructions to:
- analyze images captured by the camera to recognize codes in the images, wherein the codes comprise one or more of the following: two-dimensional bar codes, three-dimensional bar codes, or alphanumeric codes, and
- upon detection of one of the codes, parse the detected code to extract the identifier for the sensor device from the detected code.

33. The system of claim 30, wherein:
the receiver comprises a camera; and
the instructions to detect each of the building environmental sensor devices comprise instructions to analyze images captured by the camera to identify an object that is a sensor device in the images.

34. The system of claim 30, wherein:
the instructions to detect each of the building environmental sensor devices comprise instructions to:
- analyze signals received via the receiver, wherein the signals comprise one or more of the following: radio frequency signals, near-field communication signals, or optical signals; and
- upon detection of one of the signals, parse the detected signal to extract the identifier for the device from the detected signal.

35. The system of claim 30, wherein the instructions to implement the commissioning process further comprise instructions to:
- detect, via an environmental sensor of the portable electronic device, a first value of an environmental parameter;
- query the sensor device for a second value of the environmental parameter as detected by a component of sensing device;
- compare the first value and the second value to determine whether the first and second values match; and in response to determining that the first and second values do not match, determining that the sensor device requires calibration.

36. The system of claim 30, wherein the system comprises a mobile robotic device.

37. The system of claim 30, wherein the instructions to determine the location comprise instructions to implement a simultaneous localization and mapping algorithm as the portable electronic device moves about the environment.

38. The system of claim 30, wherein the instructions to automatically implement the commissioning process with the sensor device further comprise instructions to:
determine one or more configuration parameters for the sensor device; and
transmit the one or more configuration parameters to the sensor device.

39. The system of claim 30, further comprising instructions to, for each of the sensor devices, in response to detecting the sensor device:
query the sensor device for a battery level report;
analyze a signal received from the sensor device in response to the query; and
when the signal indicates that a battery level of the sensor device is below a threshold, generate an alert.

40. The system of claim 30, wherein the instructions further comprise instruction to, when the system determines that the sensor device is registered with the control system:
determine whether the sensor device requires re-commissioning by one or more of the following:
determining whether the sensor device was last commissioned more than a threshold period of time ago;
determining whether the sensor device received a software or firmware update since the sensor device was last commissioned;
determining whether the sensor device received maintenance since the sensor device was last commissioned; or
determining whether the sensor device has been moved to a new location; and
when the system determines that the sensor device requires re-commissioning, implementing the commissioning process with the sensor device.

41. A method of commissioning building environmental sensors, the method comprising:
by an electronic device comprising a processor and a receiver, as the electronic device moves about an environment:
detecting, via the receiver, each of a plurality of building environmental sensor devices that are installed in the environment;
determining a location of the sensor device by performing one or more of the following:
receiving images from a camera of the electronic device, processing the images to recognize a known landmark in the images, accessing a map of the environment, and determining the location to correspond to a place of the known landmark in the map;
receiving images from the camera, outputting the images on a display of the electronic device or of a remote control system, and receiving the location via a user interface of the electronic device or of the remote control system; or
receiving signals from a plurality of beacons in the environment in which the electronic device is moving, and using a triangulation process to process the signals and yield the location; and
for each of the sensor devices, in response to detecting the sensor device:
retrieve an identifier for the sensor device,
determine whether the sensor device is registered with a control system,
if the sensor device is registered with the control system, do not automatically implement a commissioning process with the sensor device, and
if the sensor device is not registered with the control system, automatically implement the commissioning process with the sensor device.

42. The method of claim 41, wherein automatically implementing the commissioning process comprises one or more of the following, for each sensor:
sending the location of the sensor device and the identifier to the control system;
transferring, to the sensor device, a token that the sensor device can use to communicate with the control system via a wireless network;
transferring one or more or configuration parameters to the sensor device;
determining whether the sensor device requires calibration by:
using an environmental sensor of the electronic device to detect a first value of an environmental parameter,
querying the sensor device for a second value of the environmental parameter as detected by a component of the sensor device,
comparing the first value and the second value to determine whether the first and second values match, and
when the first and second values do not match, determining that the sensor device requires calibration.

43. The method of claim 41, wherein:
the receiver comprises a camera; and
detecting each of the building environmental sensor devices comprises:
analyzing images captured by the camera to recognize codes that correspond to sensors in the images, wherein the codes comprise one or more of the following: two-dimensional bar codes, three-dimensional bar codes, or alphanumeric codes, or
analyzing images captured by the camera to identify an object that is a sensor in the images.

44. The method of claim 41, wherein determining the location of the sensor device further comprises implementing a simultaneous localization and mapping algorithm in an autonomous mobile robotic device that caries the camera as the autonomous mobile robotic device moves about the environment.

45. The method of claim 41, further comprising, by the electronic device:
querying the sensor device for a battery level report;
analyzing a signal received from the sensor device in response to the querying; and
when the signal indicates that a battery level of the sensor device is below a threshold, generating an alert.

46. The method of claim 41, further comprising, by the electronic device upon determining that the sensor device is registered:
determining whether the sensor device requires re-commissioning by:
determining whether the sensor device was last commissioned more than a threshold period of time ago,
determining whether the sensor device received a software or firmware update since the sensor device was last commissioned, determining whether the sensor device received maintenance since the sensor device was last commissioned, or determining whether the sensor device has been moved to a new location; and when the electronic device determines that the sensor device requires re-commissioning, implementing the commissioning process with the sensor device.

\* \* \* \* \*